United States Patent
Kaspersky et al.

(10) Patent No.: US 7,730,535 B1
(45) Date of Patent: *Jun. 1, 2010

(54) CONSTRAINT-BASED AND ATTRIBUTE-BASED SECURITY SYSTEM FOR CONTROLLING SOFTWARE COMPONENT INTERACTION

(75) Inventors: Eugene V. Kaspersky, Moscow (RU); Andrey P. Doukhvalov, Moscow (RU); Pavel V. Dyakin, Moscow (RU); Dmitry A. Kulagin, Moscow (RU); Andrey V. Kryukov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 184 days.

This patent is subject to a terminal disclaimer.

(21) Appl. No.: 12/120,624

(22) Filed: May 14, 2008

Related U.S. Application Data

(63) Continuation of application No. 11/773,283, filed on Jul. 3, 2007, now Pat. No. 7,386,885.

(51) Int. Cl.
  G06F 11/30 (2006.01)
  G06F 9/44 (2006.01)
  G06F 3/00 (2006.01)
(52) U.S. Cl. ................... 726/22; 726/17; 713/164; 719/313
(58) Field of Classification Search .............. 719/313; 713/164

See application file for complete search history.

(56) References Cited

U.S. PATENT DOCUMENTS

| | | | |
|---|---|---|---|
| 5,504,814 A * | 4/1996 | Miyahara | 726/4 |
| 6,308,273 B1 | 10/2001 | Goertzel et al. | |
| 6,308,274 B1 | 10/2001 | Swift | |
| 6,412,070 B1 * | 6/2002 | Van Dyke et al. | 726/17 |
| 6,505,300 B2 | 1/2003 | Chan et al. | |
| 6,658,571 B1 * | 12/2003 | O'Brien et al. | 726/26 |
| 6,922,774 B2 * | 7/2005 | Meushaw et al. | 713/151 |
| 6,978,381 B1 | 12/2005 | Te et al. | |
| 7,249,379 B2 * | 7/2007 | Larsen | 726/22 |
| 7,263,718 B2 * | 8/2007 | O'Brien et al. | 726/6 |
| 7,386,885 B1 * | 6/2008 | Kaspersky et al. | 726/22 |
| 2003/0055991 A1 | 3/2003 | Krishnapuram et al. | |
| 2003/0154397 A1 * | 8/2003 | Larsen | 713/201 |
| 2004/0199763 A1 * | 10/2004 | Freund | 713/154 |
| 2005/0182966 A1 * | 8/2005 | Pham et al. | 713/201 |
| 2005/0251508 A1 | 11/2005 | Shimizu | |
| 2005/0262362 A1 | 11/2005 | Patrick et al. | |

FOREIGN PATENT DOCUMENTS

EP 1631032 3/2006

\* cited by examiner

*Primary Examiner*—Christian LaForgia
(74) *Attorney, Agent, or Firm*—Bardmesser Law Group

(57) ABSTRACT

In a computer system having a plurality of software components, a security system for controlling interactions between the software components, the security system including at least one constraint associated with the interaction; and at least one attribute associated with the software components. The attributes and interaction parameters are bound to the constraint. The security system reaches a verdict permitting or forbidding the interaction, by resolving the constraint, based on value of the attribute and values of the parameters. The security system uses constraints and attributes specified during different life stages of each software component, where constraints are incrementally added during each subsequent life stage.

15 Claims, 11 Drawing Sheets

CONSTRAINT-BASED AND ATTRIBUTE-BASED SECURITY SYSTEM FOR CONTROLLING SOFTWARE COMPONENT INTERACTION

CROSS-REFERENCE TO RELATED APPLICATIONS

This application is a continuation of U.S. patent application Ser. No. 11/773,283, filed on 3 Jul. 2007, which is incorporated by reference herein in its entirety.

BACKGROUND OF THE INVENTION

1. Field of the Invention

The present invention relates to computer security systems for ensuring secure interaction between various software components.

2. Description of the Related Art

EP1631032 describes a method and system for control of computer resources based on various parameters and access policies. This reference describes how parameters for accessing a certain resource (such as a software component) are formed.

U.S. Pat. No. 6,978,381 describes a system and method for processing of secure data. In this reference, a list that includes various access levels, profile lists and user lists is formed. The access to the data is then implemented based on the lists.

U.S. Patent Publication No. 2005/0251508 describes a system and method for file access that uses a list of file parameters. The access to the files is implemented is based on the parameters list.

U.S. Patent Publication No. 2003/0055991 describes a system and method for accessing an object. This reference describes how the data regarding the object, the access commands, the data regarding the actions, etc. are formed. The mechanism for determining whether access to the object should be permitted utilizes a first set of commands for access control, where the object has specified parameters that correspond to the object context. A second set of commands controls access such that the parameters of the access are hierarchically broader than the parameters of the context.

U.S. Patent Publication No. 2005/0262362 describes access control to an object based on parameters relating to its name, parameters relating to resources, and parameters relating to the object itself.

One of the difficulties in a modern approach of software development and in ensuring security for interaction between software components is the fact that the component itself has to be designed with security in mind. In other words, security aspects must be built into the component itself, and, generally, cannot easily be added or changed later. This adds a considerable burden on the developer, and also increases the likelihood of bugs and errors in the software, which virus writers and hackers can exploit down the line. On the other hand security requirements for distribution, deployment, selling, licensing, configuration, administration, using, etc. are highly dependent on a particular use case. These types of different requirements are very difficult to implement and even to enumerate in advance, which makes it virtually impossible for software component users to enforce their own security strategy, if it does not correspondent to the security model implemented in the software component.

An example of such a built-in security system can be found, for example, in modern file systems, such as the NTFS file system, the mail services, phone services, such as those available in Microsoft Windows™, and so forth. For example, in the case of the NTFS file system, the Microsoft Windows™ operating system checks whether whichever software components is trying to access a file actually has permission to access that file. In this case, the security is built into the file system and the APIs that support it.

On the other hand, earlier systems, such as FAT32 and FAT16, do not have a built in security, and adding a level of security to these file systems is virtually impossible. Even those conventional systems that have security built into them do not have the option of changing the parameters of the security system based on the life stage of the particular software component.

Accordingly, there is a need in the art for a system and method that addresses secure interaction between software entities, in a manner that removes much of the burden relating to the security of the interaction from the developer of the software component itself.

SUMMARY OF THE INVENTION

Accordingly, the present invention is directed to a method and system for controlling interaction between software components using constraints and parameters that substantially obviates one or more of the disadvantages of the related art.

In one aspect of the invention, there is provided a system, method and computer program product for controlling interactions between software components, including means for associating at least one constraint with the interaction; means for associating at least one attribute with each software component; means for binding the attribute and interaction parameters to the constraint; and means for resolving the constraint, based on values of the attribute and the parameters, regarding whether or not to permit the interaction.

As various options, the security system controls all interactions between all components in the computer system. The security system is built into an operating system of the computer system, and runs on a kernel level of an operating system of the computer system. Additional constraints and attributes can be specified at each subsequent life stage of the component. Each subsequent life stage associates at least as many additional constraints with the interaction as the previous life stage. The life stage includes any of design, development, sale, installation, administration, and use. When multiple constraints are resolved, resolving one constraint does not affect resolving of any other constraint. The constraint is specified in the same language as the language in which the software components are written and/or in a language that is independent of the language in which the software components are written. The constraint is resolved in a secure environment that is inaccessible to the software components. Secure storage can be used to store the constraints and the attributes.

In another aspect, there is provided, in a computer system having a plurality of software components running thereon, a method, system and computer program product for controlling interactions between the software components, including associating at least one constraint with the interaction; associating at least one attribute with each software component; binding the attributes and interaction parameters to the constraint; and resolving the constraint, based on values of the attributes and the parameters, regarding whether or not to permit the interaction.

In another aspect, there is provided, in a computer system having a plurality of software components running thereon, a method, system and computer program product for controlling interactions between the software components, including associating at least one constraint with the interaction; and associating at least one attribute with the software components; binding the attribute and interaction parameters to the constraint; reaching a verdict permitting or forbidding the interaction, by resolving the constraint, based on value of the attribute and values of the parameter; and using constraints and attributes specified at different life stages of each software component, wherein constraints are incrementally added during each subsequent life stage.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
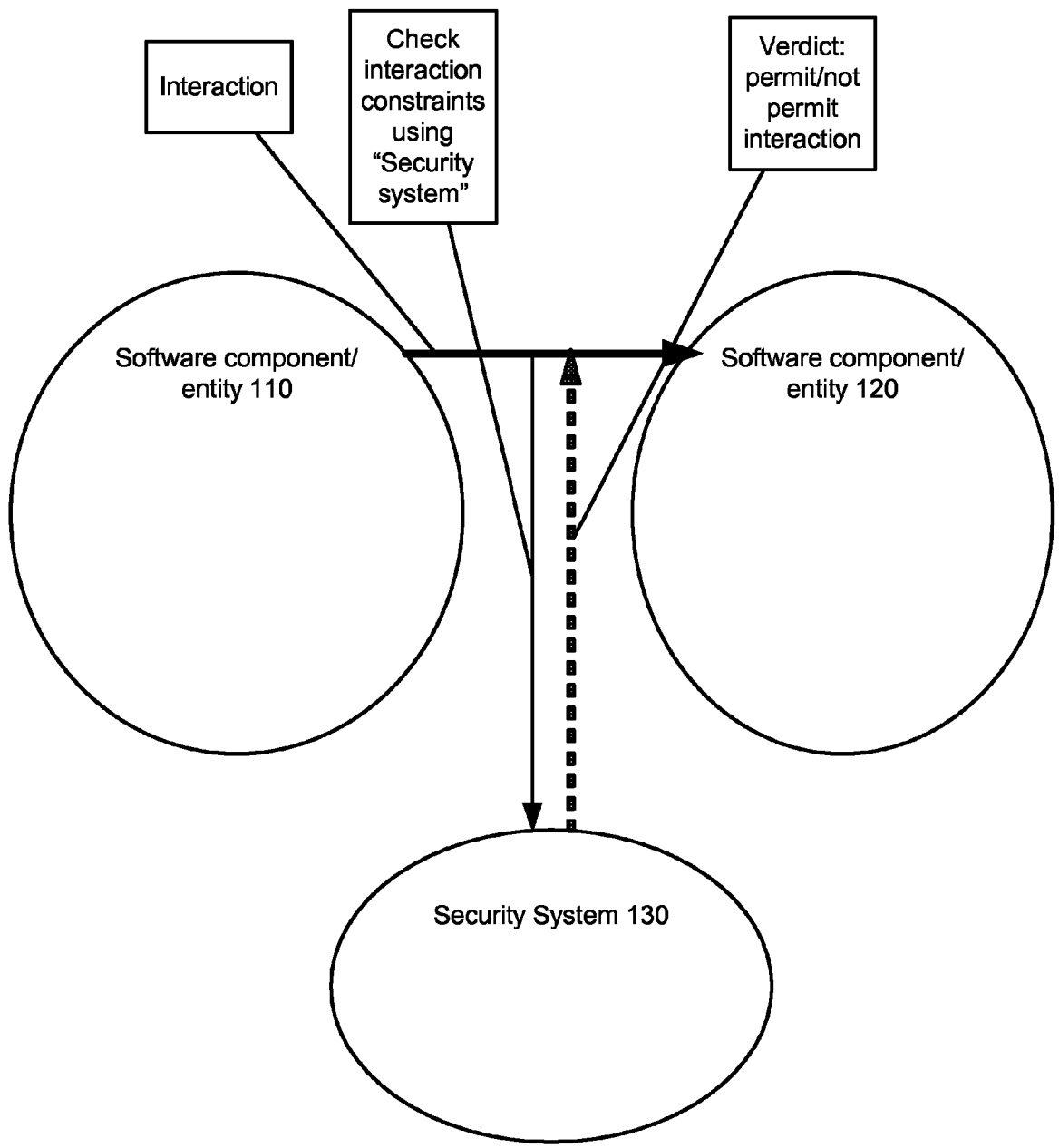
FIG. 1 illustrates a system block diagram of how software components interact with each other.

Reference will now be made in detail to the preferred embodiments of the present invention, examples of which are illustrated in the accompanying drawings.

The following definitions will be used throughout the discussion below:

Security system is a system for storing, managing, and controlling access to information that provides for controlled interactions between software components of a computer system. The security system resolves constraints for verdict to permit or forbid interactions between the software components. The security system also provides a means to manipulate parameters and constraints in a safe way. The security system views each software component in terms of its interactions.

Interaction is a request from one software component to another software component. An interaction is characterized by a set of interaction parameters, which includes data transmitted during interaction. An interaction is associated with constraints that need to be resolved in order to make the interaction possible.

Attribute is a named property associated with the software component that has some value.

Constraint is a parameterized rule, used for evaluating the verdict regarding permission (or non-permission) of the interaction. During the evaluating, constraint parameters are replaced by attribute values and interaction parameters.

Constraint declaration means associating a constraint with the interaction for the purposes of evaluating the verdict that permits (or forbids) the particular interaction. The constraint declaration also specifies the formal requirement for the subsequent Constraint definition as well as for the subsequent Constraint binding.

Constraint definition is an algorithm for resolving the constraint, for example, whether the constraint parameter falls within a specified range of values, belongs to a specified list of values, or some more complex algorithm.

Constraint binding specifies which parameters of what software components have to be used in order to be substituted as constraint parameters.

Constraint resolving is a mechanism for searching for attributes specified in the Constraint binding phase, and using their values as the appropriate constraint parameters, and then evaluating constraint. The result of the evaluation is used by the security system to reach the verdict.

It should be noted that the term 'software component' is broadly understood to be any entity that requests something from another entity, such as a regular user application, applet, servlet, terminal application and so forth. Thus, one such software component can be, for example, a web browser and another software component can be a web server. As another example, one software component may be a computer program running on a computer, and another software component may be a different computer program that receives a request from the first computer program. Still another possibility, one software component can be the server to which the user's computer addresses its requests, and another software component can be a second server, to which the first server re-addresses its requests. The discussion herein is in terms of interacting components, or entities, and the terms 'components' or 'entities', are used in a broad sense (such as stand alone pieces of software, software modules, system services, file systems, robot units, and so on). One of ordinary skill in the art would readily appreciate that the examples given above are not exhaustive, and many other embodiments and examples of software components and entities that can interact in the manner described herein can be contemplated.

In the present invention, the concept of security for interacting components is taken outside the development of the software component, and is built into the operating system (or the environment that supports the interaction), so that interaction between any two components is always carried out under control of the security system, and therefore cannot be circumvented. As such, the security system needs to have sufficient rights to monitor and control the interaction. The security system can have the same rights as the OS and be 'located' in (built into) the OS kernel (though this is not always necessary, and the security system can also be a user application whose sole 'right' is to monitor and control the interactions). In the preferred embodiment, all interactions in the system are controlled, although some of the interactions between components might be exempt from security system oversight.

According to the present invention, the interactions are controlled, and the degree of control can depend on the stage of the software development and use, for example, the design stage, the development stage, the sales stage, the deployment stage, and the use/functionality stage as well as other stage(s). Each of these stages can require different constraints on the interactions and usually (though not necessarily) each successive stage will have at least as many constraints and usually more constraints than the preceding stage. As will be apparent to one of ordinary skill in the art, the number of such stages and their nature generally depends on the particular component and its commercial use, and the present invention is not limited to only the life stages of the components discussed above.

The proposed method for controlling the interaction between two software components relies on separating the means of controlling the interaction (for permitting or forbidding) from the functionality of the software components itself. This implies that the software developer does not need to build in any parameters, constraints or restrictions into the software component, since the security terms are supervised by someone else, such as a system administrator, a user, a salesperson, and so forth via the security system.

As illustrated in FIG. 1, a first software component 110 interacts with a second software component 120, under control of the security system 130. The security system 130 permits or forbids the interaction between the two software components 110, 120.

Figure 2:
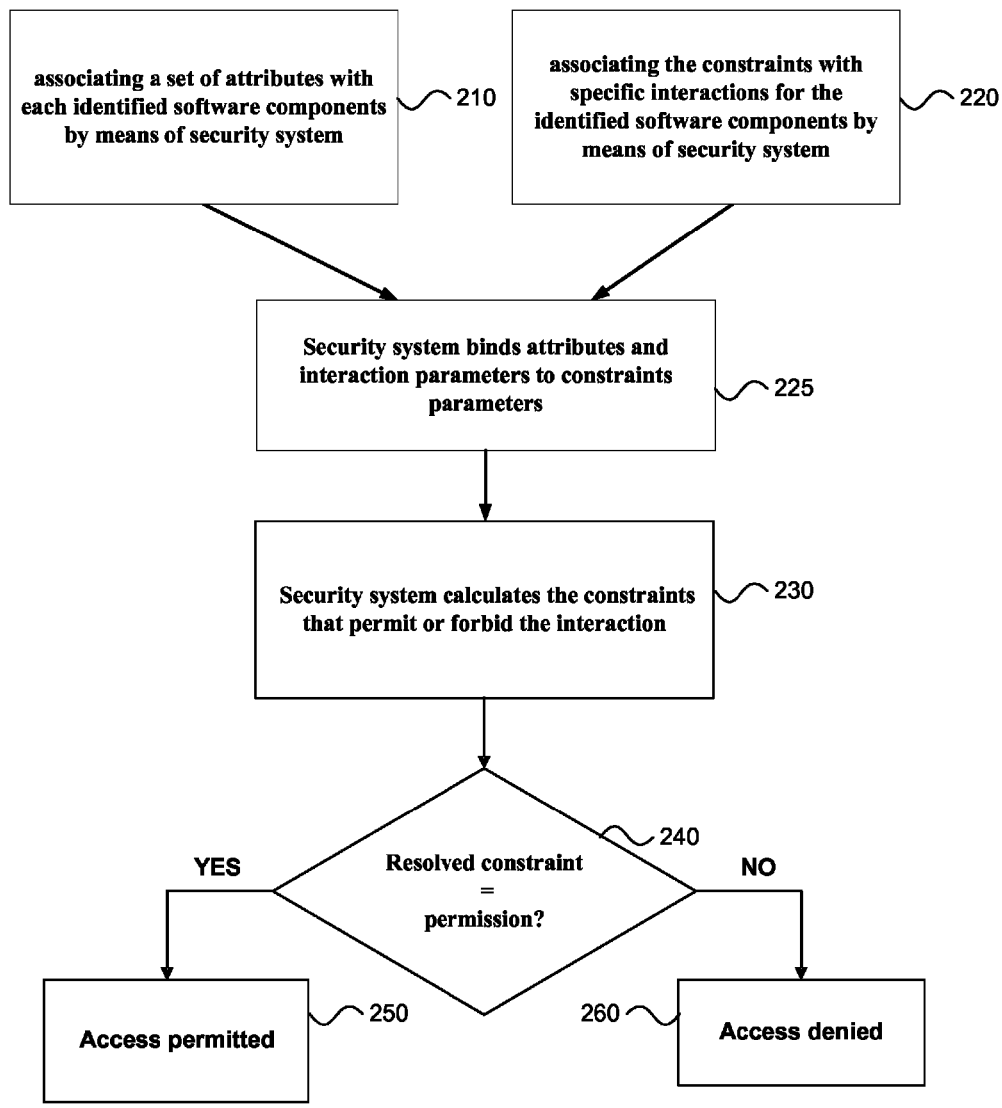
FIG. 2 illustrates a system block diagram of how security system works step by step to reach a verdict.

As shown in FIG. 2, in step 210, a set of parameters is associated with software components by means of security system 130, and in step 220, a set of constraints is associated with a particular interaction (of the two interacting components 110, 120). Then, the security system 130, in step 225, binds the parameters and the interaction parameters to the constraints parameters.

After step 225, the security system resolves the constraints that permit (or do not permit) the interaction between the two components (step 230). Such resolution is performed based on actual values of the parameters of the interacting components 110, 120, as well as (possibly) on the values of parameters of various components present in the computer (and which are not shown in the figures).

Based on the results of the resolution, the security system 130, in step 240, either permits or forbids the components 110, 120 to interact with each other (see step 250, where the security system permits the interaction, and see step 260 where the security system 130 forbids the interaction).

Also, it should be noted that the security system 130 preferably resolves the constraints in an isolated secure environment (to which the software components themselves have no access, so that the components could not circumvent the security system).

Figure 4:
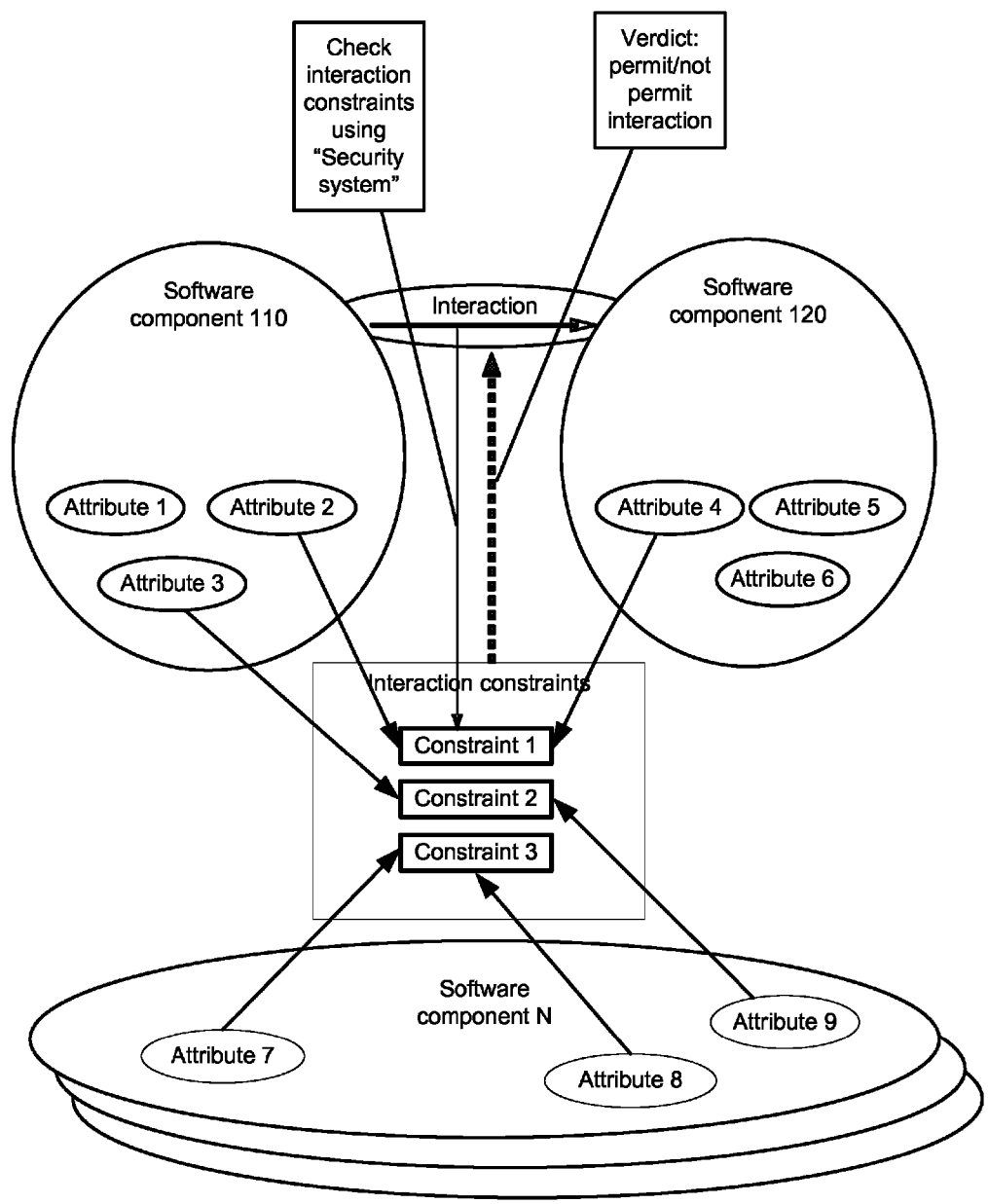
FIG. 4 illustrates an interaction of two software components.

FIG. 4 illustrates an example of the interaction between two components 110 and 120, with participation of the security system 130 in the interaction. The dashed arrow in the figure illustrates the application of the verdict to the interaction, where the verdict is resolved based on the constraints. Attribute1, Attribute2, Attribute3 are parameters of the software component 110 and Attribute4, Attribute5, Attribute6 are parameters of the software component 120. Attribute7, Attribute8, Attribute9 are parameters of other components (shown as SOFTWARE COMPONENT N), which do not participate in this interaction. Constraint1, Constraint2, Constraint3 are constraints for this particular interaction.

In FIG. 4, the arrow between the two components 110 and 120 represents the data, which is transmitted during the interaction. The arrows between the parameters and the constraints represent binding the parameters to the constraint parameters.

Figure 5:
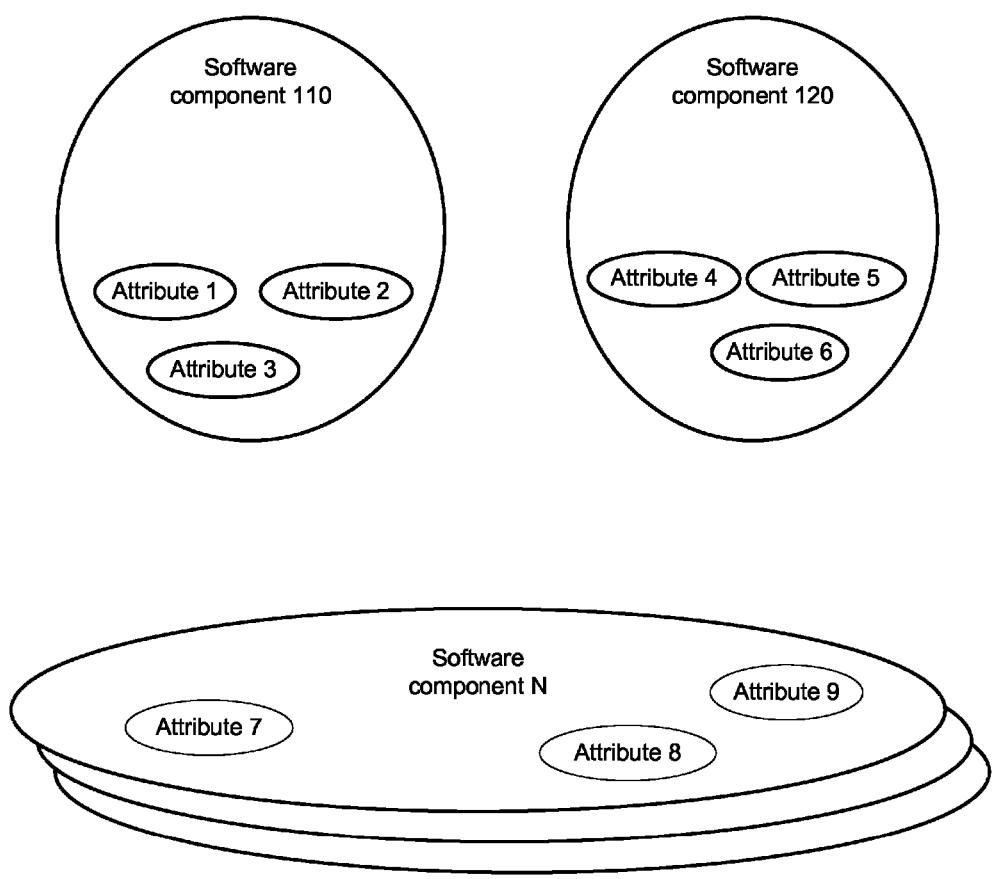
FIG. 5 illustrates how sets of parameters are associated with the software components illustrated in FIG. 4.

FIGS. 5-8 illustrate an interaction process under control of the security system, i.e. different stages of the interaction. As shown in FIG. 5, each software component is associated with a set of parameters (Attribute1, Attribute2, Attribute3 for component 110, Attribute4, Attribute5, Attribute6 for component 120, and Attribute7, Attribute8, Attribute8 for component N).

Figure 6:
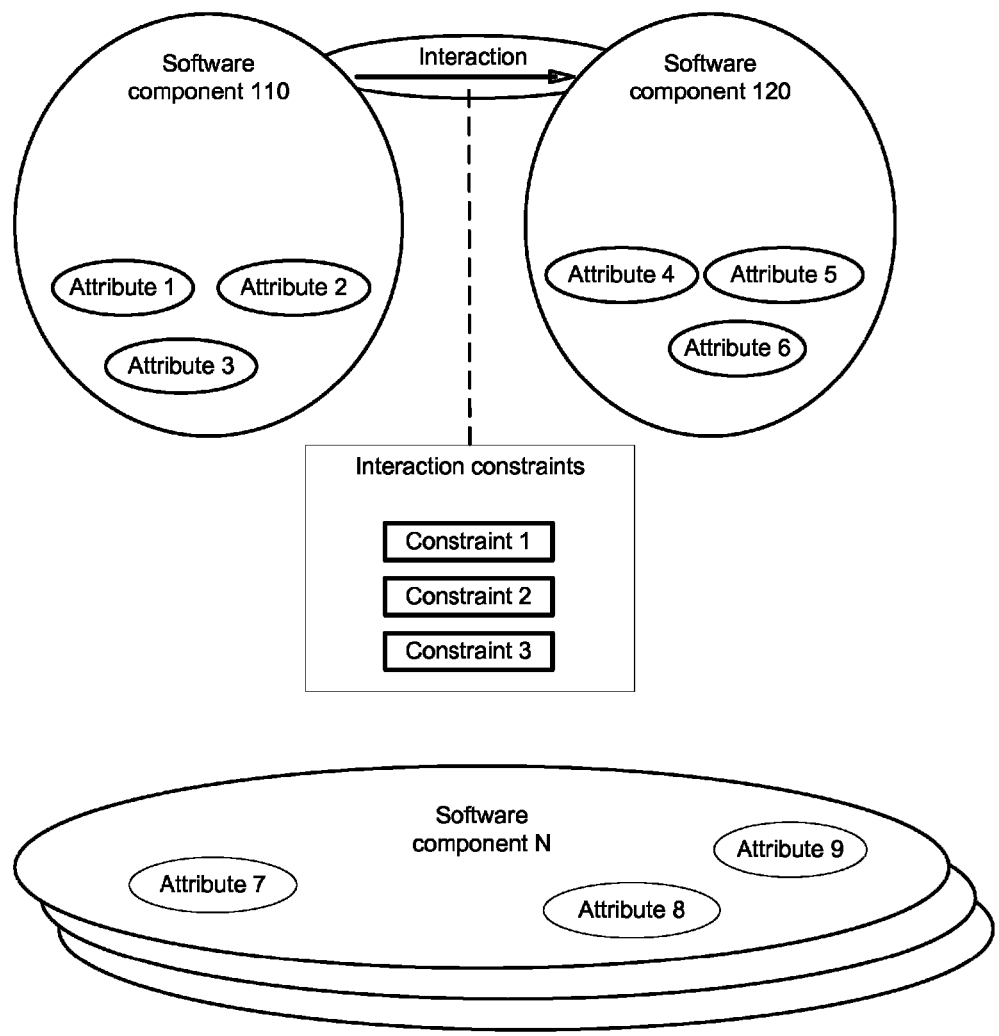
FIG. 6 illustrates the declaration for constraints for a particular interaction, and a set of external parameters for interactions between the software components of FIG. 4.

As shown in FIG. 6, the interaction between components 110 and 120 is associated with the set of constraints (Constraint1, Constraint2, Constraint3).

Figure 7:
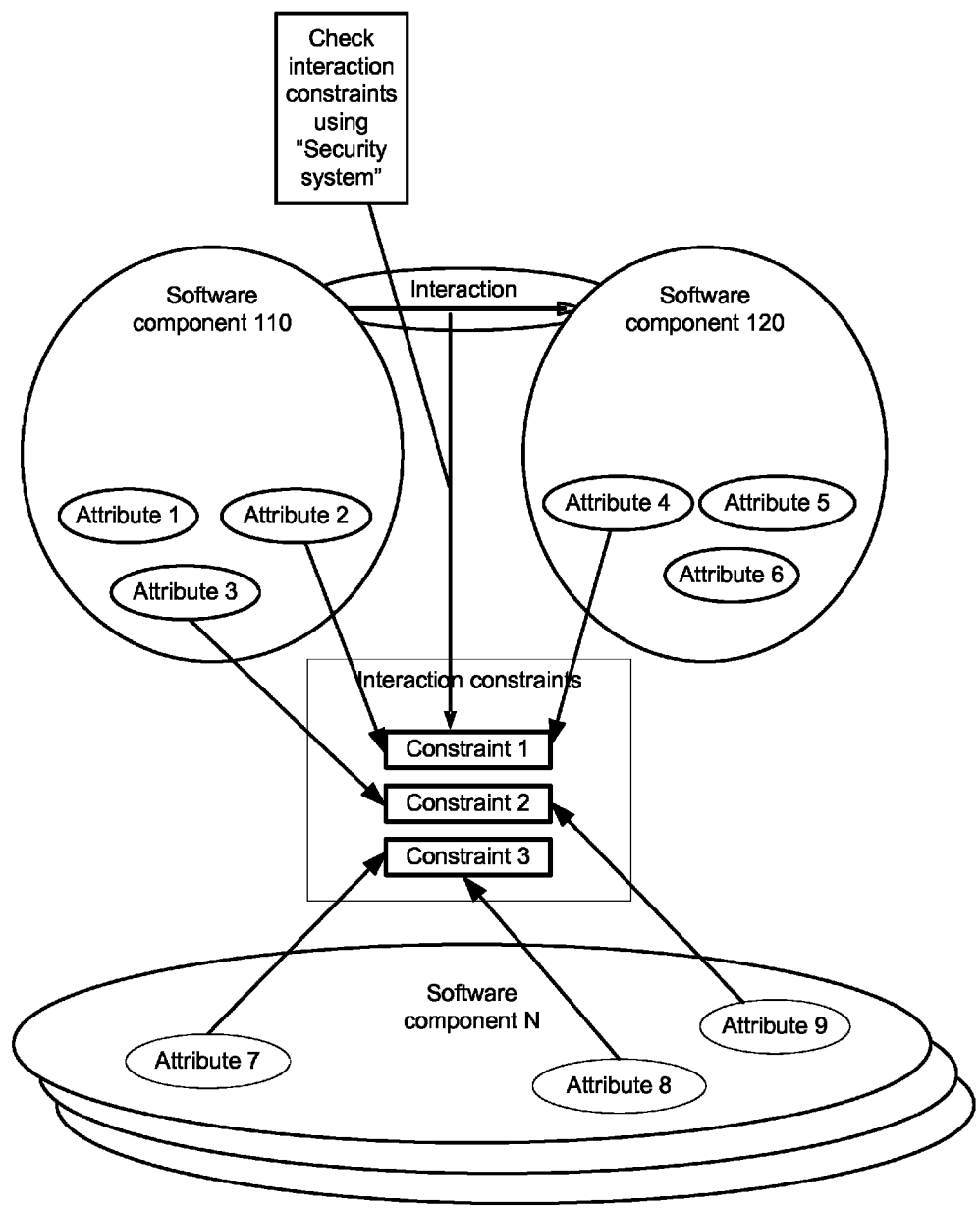
FIG. 7 illustrates how the parameters are bound to the constraints for the interaction of components shown in FIG. 4.

As shown in FIG. 7, the parameters of interaction are bound to the constraint parameters.

Figure 8:
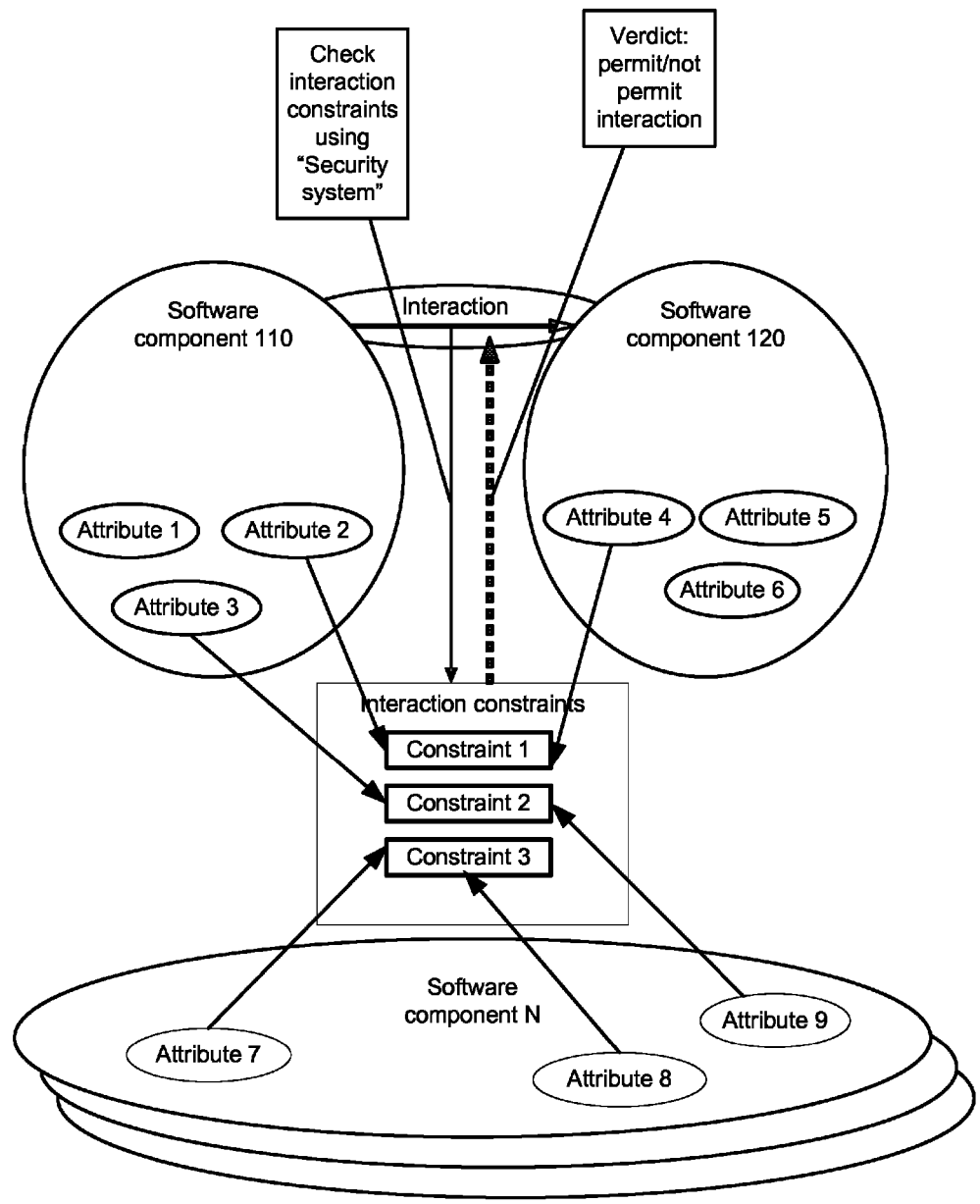
FIG. 8 illustrates how the verdict for permission of the interaction is readied for the interaction of components shown in FIG. 4.

As shown in FIG. 8, the verdict regarding permission or refusal of the interaction is evaluated by resolving the set of bound constraints. The verdict is applied to the interaction (the dashed arrow) and the interaction is either permitted or forbidden.

The following is an example of how the discussion above can apply to one particular system service—PHONE_SERV, which is Microsoft Windows™ service for the telephone dialler. This software component serves for connecting to a telephone number. In this case, the following constraints can be used:

only those applications that have permission from a system administrator can request service from PHONE_SERV.

any local calls, from any computer user, are permitted at any time.

long distance calls are permitted during work hours.

The constraints are represented by the following:

Constraint1: interaction with the PHONE_SERV is permitted only to components from the list specified by the system administrator. The constraint has one parameter: the identifier of the software component that interacts with PHONE_SERV.

Constraint2: all users are permitted to use long distance service, except for users that belong to the 'guest' group. The constraint has one parameter: the identifier of the user.

Constraint3: long distance calls are permitted only from 10 a.m. to 8 p.m. during workdays. The constraint has one parameter: the time of the request to PHONE_SERV.

Thus, the three constraints are applied to the interaction between any component and the component PHONE_SERV. A verdict that permits the interaction is given by the security system 130 when all the three constraints are satisfied.

The following parameters are used to bind to the constraints:

1. ComponentID is an identifier of the software components that request something from PHONE_SERV. The identifier is automatically assigned to each software component when the component is installed on the computer system.

2. UserID is an identifier of the user. The identifier of the user is automatically assigned to each user when the user logs into the computer system.

3. CurrentTime is an attribute of the software component 'system timer.'

In order to resolve the verdict for permitting (or forbidding) the interaction, the security system 130 needs to bind and resolve all the appropriate constraints.

1. Binding Constraint1: The attribute ComponentID is bound to the parameter of the Constraint1.

2. Binding Constraint2: The attribute UserID is bound to the parameter of the Constraint2.

3. Binding Constraint2: The attribute CurrentTime of the software component System Timer is bound to the parameter of the Constraint3.

4. Resolving Constraint1: The security system 130 uses the value of the attribute ComponentID as the parameter of Constraint1 and evaluates Constraint1. If it gives a positive result, then the security system 130 proceeds to resolving the remaining constraints, otherwise, the verdict is to forbid the interaction.

5. Resolving Constraint2: The security system 130 uses the value of the attribute UserID as the parameter of Constraint2 and evaluates the constraint. If the evaluation gives a positive result, then the security system 130 proceeds to resolving the remaining constraints, otherwise, the verdict is to forbid the interaction.

6. Resolving Constraint3: The security system 130 uses the value of the attribute CurrentTime (of component System-Timer) as the parameter of Constraint3. If it gives a positive result, then the security system 130 gives a verdict to permit the interaction, otherwise, interaction is prohibited.

Separating the component functionality development from mechanisms that assure security permits entry of definitions of the parameters, constraints and their association with the components depending on whether or not they are required for the particular life stage of the component—i.e., not only at the development stage, but also at the stage of distribution, use, administration, and so on.

Figure 9:
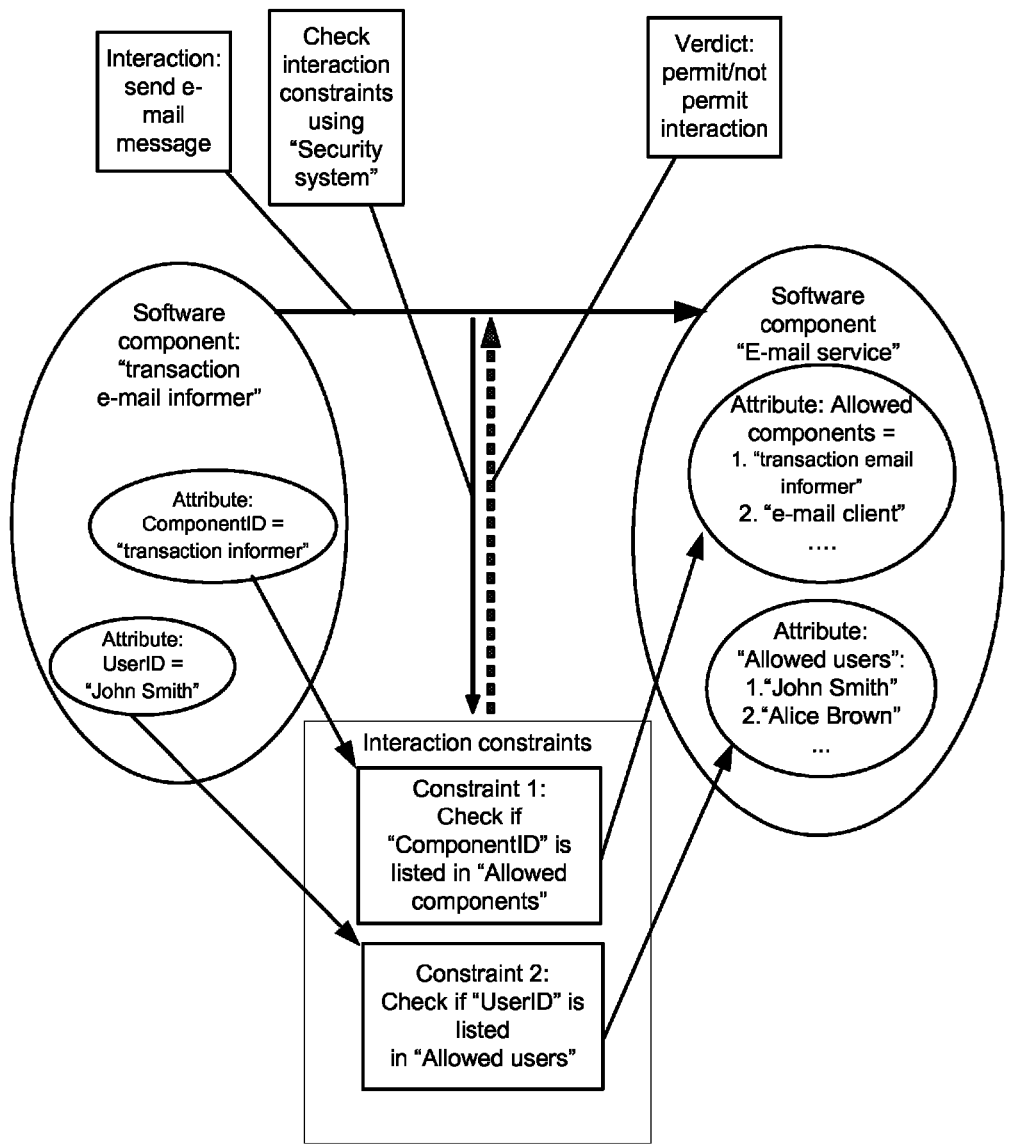
FIG. 9 illustrates an example of interaction of Transaction E-mail Informer and E-Mail service components.

FIG. 9 illustrates the second example of how the discussion above can apply to one particular system service, in this case, the Transaction E-mail Informer as component 110 and the E-Mail service as component 120. The interaction is e-mail message sending as notification about some transaction.

Figure 10:
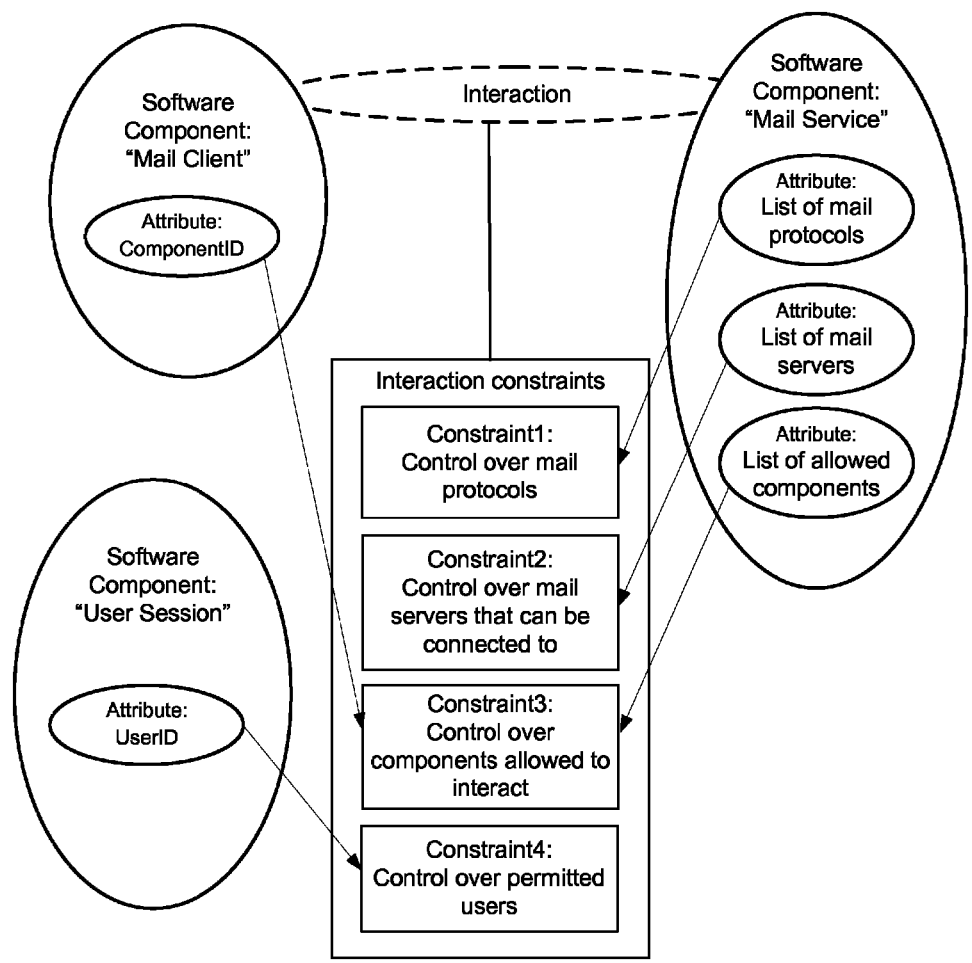
FIG. 10 illustrates an example of multi-stage parameters and constraints specification.

Another example also (illustrated in FIG. 10) shows the approach described herein is the user interface for the Mail Service component, which, in this case, is dependent upon which of the life stage of the software component is at issue. Depending on the stage in the life cycle of the Mail Service, the following constraints are used:

Constraint1 controls supported mail protocols (POP3, IMAP4, SMTP, etc. for example);

Constraint2 controls allowed mail servers, over which the Mail Service sends and receives mail (for example, pop3.mailserver1.com, smtp.mailserver1.com, imap4.mailserver1.com, etc.);

Constraint3 controls software components that are permitted to request services from the Mail Service (Transaction E-mail Informer (see FIG. 9), Outlook Express, etc);

Constraint4 controls which of the users are allowed to request services from the Mail Service. (John Smith, Alice Brown, etc)

This is illustrated in Table 1 below:

TABLE 1

| | Stages of life cycle of Mail Service component | | | |
|---|---|---|---|---|
| | Design | Development | Installation | Administration | Use |
| Constraint1 | Declaration, Definition | | Binding | | |
| Constraint2 | | Declaration | Definition, Binding | | |
| Constraint3 | | | Declaration, Definition | | Binding |
| Constraint4 | | | Declaration | Definition | Binding |

As may be seen from the above table for the software component Mail Service, there are the following life stages: component design, component development, installation, administration, and use. For Constraint1 (in other words, control over supported mail protocols), the constraint declaration and constraint definition are done at the design stage. The definition and declaration are carried out based on the considerations given above. Therefore, in this case, for Constraint1, the constraint declaration means the following: when another component requests a service from the Mail Service it is necessary to verify that an appropriate mail protocol is used. The constraint parameter in this case is the list of identifiers of the protocols.

For the same Constraint1, the definition of the constraint ensures that the requested protocol is on the list of the supported protocols.

At the installation stage, a binding is performed for Constraint1, the constraint parameter is bound to the supported Protocols attribute of the Mail Service.

For Constraint2 (control over allowed mail servers), at the development stage the constraint declaration is performed, and at the installation stage, the constraint definition and constraint binding are performed.

For Constraint3 (control over permitted components), at the installation stage, the constraint is declared, and defined (the list of allowed components), and at the use stage, the constraints are bound. In this case, the constraint declaration means that when requesting something from the Mail Client service, it is necessary to check whether the component making the request to the service is allowed to do this. The constraint definition, in this case, determines that the component must belong to the group of components that are registered as having access to this service.

For Constraint4 (control over permitted users), at the installation stage, the constraint is declared, at the administration stage, the constraints are defined (the list of allowed users), and at the use stage, the constraints are bound. The definition of the constraints ensures that the user belongs to the group of users permitted to send and receive mail. The UserID attribute (of the User Session component) is used to bind the constraint.

Figure 3:
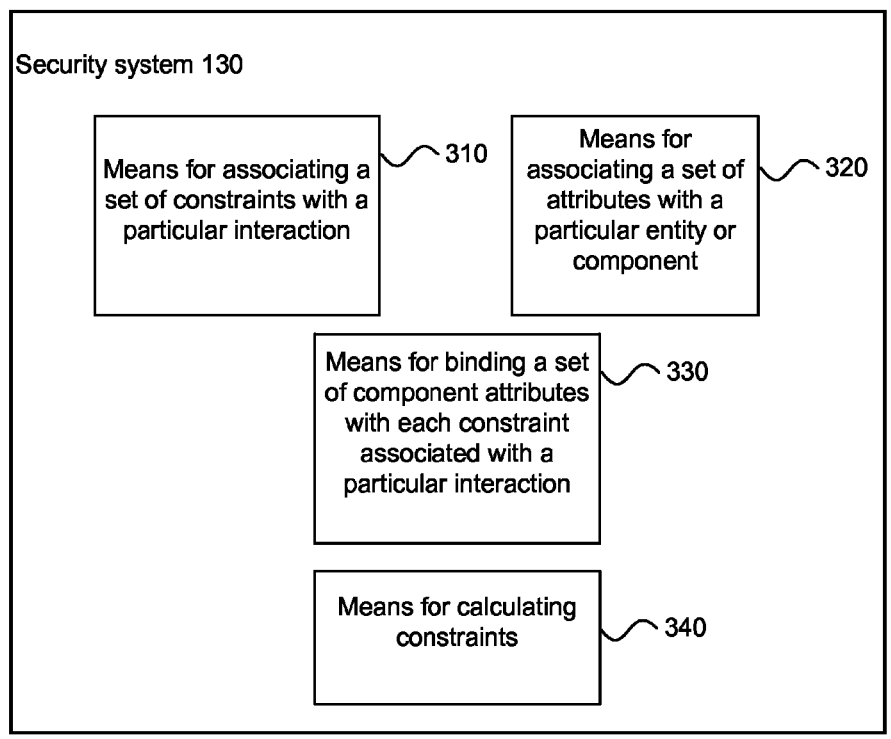
FIG. 3 illustrates a security system for the architecture of FIG. 1.

A system for control of the interaction that implements the above method will now be described. A security system 130 as shown in FIG. 3 provides:

a. means 310 for associating a set of constraints with a particular interaction;

b. means 320 for associating a set of parameters with components;

c. means 330 to bind parameters and interaction parameters with constraints; and d. means 340 for resolving constraints regarding whether to permit or to forbid the interaction.

Figure 11:
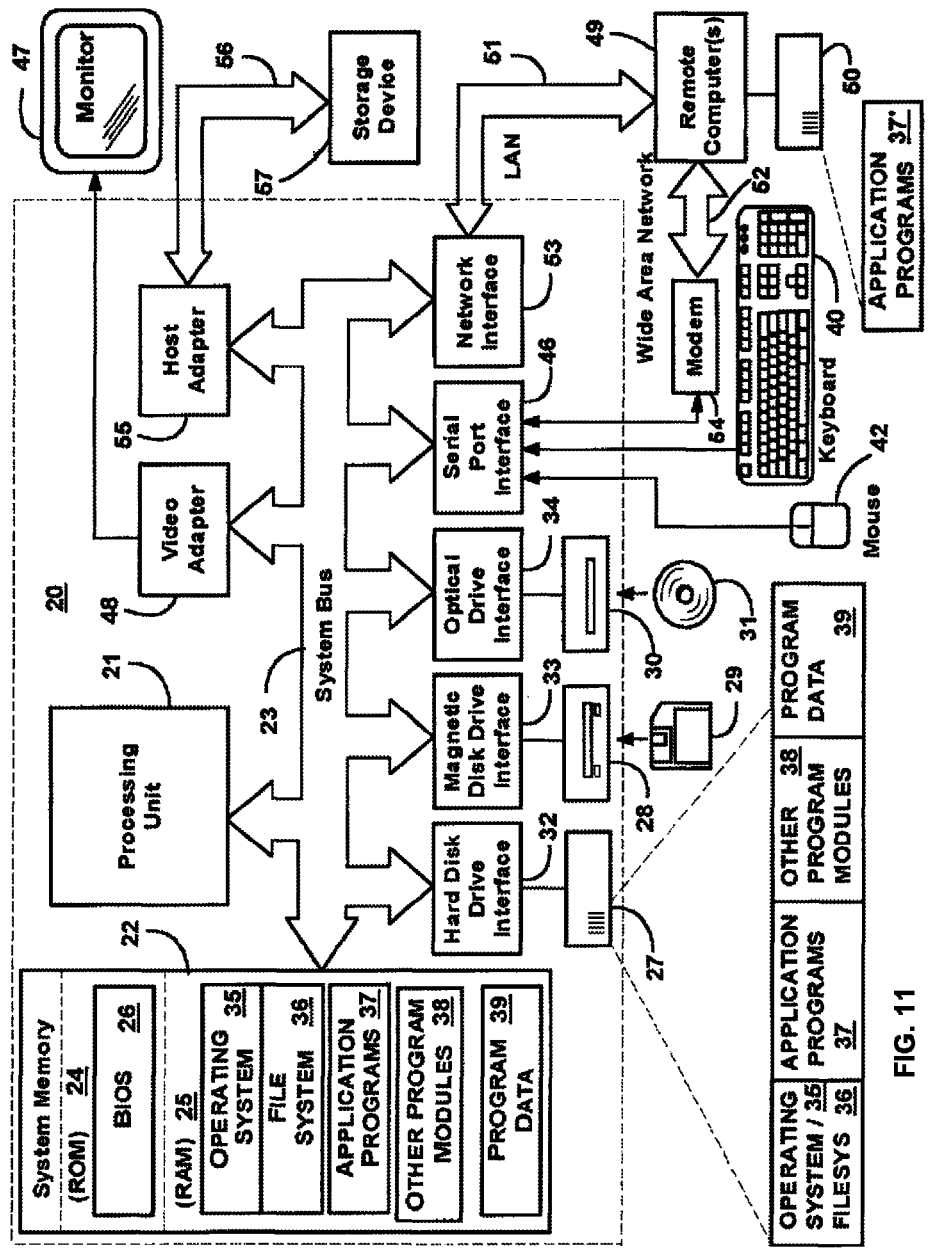
FIG. 11 illustrates an exemplary computer system on which the invention may be implemented.

With reference to FIG. 11, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24. The personal computer 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Microsoft Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, the program modules depicted relative to the personal computer 20, or portions thereof, may be stored in the remote memory storage device. It will be appreciated that the network connections shown are merely exemplary and other means of establishing a communications link between the computers may be used. Such computers as described above can be used in conventional networks, e.g., the Internet, local area networks, regional networks, wide area networks, and so forth. These networks can link various resources, such as user computers, servers, Internet service providers, telephones connected to the network, and so on.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. In a computer system having a plurality of software components running thereon, a method of using a security system for controlling interprocess interactions between the software components, the method comprising:
    (a) using the security system, associating at least one constraint with the interprocess interaction;
    (b) using the security system, coupling at least one attribute to its corresponding software component;
    (c) using the security system, binding the attribute and interaction parameters to the constraint, wherein the interaction parameters include data being transmitted during the interaction; and
    (d) permitting or forbidding the interprocess interaction, based on the constraint, the constraint being determined based on values of the at least one attribute and the parameters,
    wherein at least one additional attribute is specified for at least one subsequent life stage of each software component.

2. The method of claim 1, wherein the security system controls all interactions between all software components in the computer system.

3. The method of claim 1, wherein the security system runs on a kernel level of an operating system of the computer system.

4. The method of claim 1, wherein the at least one attribute is a dynamic attribute.

5. The method of claim 1, wherein at least one additional constraint is specified for the at least one subsequent life stage of each software component.

6. The method of claim 1, wherein multiple additional constraints and multiple additional attributes are specified at multiple subsequent life stages of each software component.

7. The method of claim 6, wherein, when multiple constraints are used to determine whether to permit, or not permit, the interaction, the value of one constraint does not affect the value of any other constraint during the same interprocess interaction.

8. The method of claim 6, wherein, each subsequent life stage associates at least as many additional constraints with the interaction as the previous life stage.

9. The method of claim 6, wherein the life stages include any two of design, development, sale, installation, and use.

10. The method of claim 1, wherein the constraint is specified in the same language as the language in which the software components are written.

11. The method of claim 1, wherein the constraint is specified in a language that is independent of the language in which the software components are written.

12. A computer useable storage medium having computer executable program logic stored thereon, the computer executable program logic executing on a processor for implementing the steps of claim 1.

13. In a computer system having a processor, a memory coupled to the processor, and a plurality of software components loaded into the memory, a security system for controlling interprocess interactions between the software components, the security system comprising:

(a) at least one constraint that the security system associates with the interprocess interaction; and
(b) at least one attribute that the security system couples to its corresponding software component,
(c) wherein, for each interaction, the security system binds the attributes and interprocess interaction parameters to the constraints,
(d) wherein the interaction parameters include data being transmitted during the interaction,
(e) wherein the security system permits or forbids the interprocess interaction based on values of the attributes and the parameters, and
(f) wherein at least one additional constraint is specified for at least one subsequent life stage of each software component.

14. The security system of claim 13, further comprising secure storage for the constraints and the attributes.

15. The security system of claim 13, wherein, when multiple constraints are used to determine whether to permit, or not permit, the interaction, the value of one constraint does not affect the value of any other constraint during the same interprocess interaction.

* * * * *